United States Patent
Ganiger et al.

(10) Patent No.: US 10,196,980 B2
(45) Date of Patent: Feb. 5, 2019

(54) BEARING OUTER RACE RETENTION DURING HIGH LOAD EVENTS

(71) Applicant: General Electric Company, Schenectady, NY (US)

(72) Inventors: Ravindra Shankar Ganiger, Bangalore (IN); Bruce Alan Carter, West Chester, OH (US); Charles Andrew Corman, Milford, OH (US)

(73) Assignee: General Electric Company, Schenectady, NY (US)

( * ) Notice: Subject to any disclaimer, the term of this patent is extended or adjusted under 35 U.S.C. 154(b) by 359 days.

(21) Appl. No.: 15/017,805

(22) Filed: Feb. 8, 2016

(65) Prior Publication Data

US 2017/0226927 A1    Aug. 10, 2017

(51) Int. Cl.
| | |
|---|---|
| *F02C 3/04* | (2006.01) |
| *F02C 7/06* | (2006.01) |
| *F16C 19/16* | (2006.01) |
| *F16C 35/067* | (2006.01) |
| *F16C 35/04* | (2006.01) |
| *F16C 33/58* | (2006.01) |

(52) U.S. Cl.
CPC ............... *F02C 7/06* (2013.01); *F02C 3/04* (2013.01); *F16C 19/16* (2013.01); *F16C 33/583* (2013.01); *F16C 35/045* (2013.01); *F16C 35/067* (2013.01); *F05D 2220/32* (2013.01); *F16C 2360/23* (2013.01)

(58) Field of Classification Search
None
See application file for complete search history.

(56) References Cited

U.S. PATENT DOCUMENTS

| | | | |
|---|---|---|---|
| 1,626,188 | A | 4/1927 | De Ram et al. |
| 5,052,828 | A | 10/1991 | Ciokajlo et al. |
| 5,791,789 | A | 8/1998 | Van Duyn et al. |
| 6,413,046 | B1 | 7/2002 | Penn et al. |

(Continued)

FOREIGN PATENT DOCUMENTS

| | | |
|---|---|---|
| EP | 2149681 A2 | 2/2010 |
| WO | 2015/130370 A2 | 9/2015 |

OTHER PUBLICATIONS

Extended European Search Report and Opinion issued in connection with corresponding EP Application No. 17154267.3 dated Jun. 27, 2017.

*Primary Examiner* — Igor Kershteyn
*Assistant Examiner* — Theodore Ribadeneyra
(74) *Attorney, Agent, or Firm* — General Electric Company; Pamela Kachur (57) ABSTRACT

A retention housing for the outer race of a bearing of a gas turbine engine includes a spring finger housing connected to and overlying a bearing housing that is connected to the outer race of the bearing. The spring finger housing includes an arrangement of spring fingers that yields a lightweight housing capable of withstanding very high radial loads combined with very high torsional windup and axial thrust load. A plurality of edge recesses are defined in the bearing housing and a plurality of lug tabs extending radially from the engine's interface shell limit are disposed in the edge recess to limit the deflection and self-arrest the distortion of the retention housing. A gas turbine engine includes the retention housing described above.

17 Claims, 5 Drawing Sheets

(56) References Cited

U.S. PATENT DOCUMENTS

| | | | |
|---|---|---|---|
| 6,540,483 | B2 | 4/2003 | Allmon et al. |
| 7,648,278 | B2 | 1/2010 | Stout et al. |
| 7,797,922 | B2 | 9/2010 | Eleftheriou et al. |
| 8,182,156 | B2 | 5/2012 | Kinnaird et al. |
| 8,282,285 | B2 | 10/2012 | Brillon |
| 8,322,038 | B1 | 12/2012 | Heidari et al. |
| 8,337,090 | B2 | 12/2012 | Herborth et al. |
| 8,727,632 | B2 | 5/2014 | Do et al. |
| 8,821,029 | B2 | 9/2014 | Antunes et al. |
| 9,016,952 | B2 * | 4/2015 | Bedenk ............... F16C 27/045 384/559 |
| 2003/0039538 | A1 | 2/2003 | Allmon et al. |
| 2006/0204153 | A1 | 9/2006 | Alam et al. |
| 2007/0031078 | A1 | 2/2007 | Hackett |
| 2011/0286836 | A1 | 11/2011 | Davis |
| 2013/0331223 | A1 | 12/2013 | McCune et al. |
| 2015/0308510 | A1 | 10/2015 | Long et al. |
| 2017/0145855 | A1 | 5/2017 | Ganiger et al. |
| 2017/0226894 | A1 | 8/2017 | Ganiger et al. |

* cited by examiner

BEARING OUTER RACE RETENTION DURING HIGH LOAD EVENTS

FIELD OF THE INVENTION

The present subject matter relates generally to a bearing in a gas turbine engine, or more particularly to an apparatus and method for retention of the outer race of the bearing.

BACKGROUND OF THE INVENTION

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section and is confined within an outer casing. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), which also is known as the high pressure spool (HP spool). Similarly, the LP compressor is coupled with the LP turbine via a low pressure shaft (LP shaft), which also is known as the low pressure spool (LP spool).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft (aka HP spool) and the LP shaft (aka LP spool). The combustion gases are then routed through the exhaust section, e.g., to atmosphere.

During normal engine operation, a ball bearing assembly can be provided to act along with the interface shell, which is non-rotatably coupled to the outer casing of the engine, to retain the axial position of the HP shaft (aka HP spool), and a roller bearing assembly can be provided to provide radial damping of the fan/rotor system. A traditional design approach consisting of an axial spring finger housing combined with a radial squeeze film oil damper can be provided to protect the bearings against damage during relatively small unbalance load situations. During these normal operating conditions, the squeeze film damper bearing requires clearance in all directions around the bearing (radial, tangential & axial) for dynamic operation. However, such axial spring finger housing contains relatively long axial spring fingers for retention of the ball bearing housing, and the long spring fingers take up space in the engine housing, add weight to the engine, have limited torsional load capability and are complicated for manufacture.

Moreover, in a failure mode that results from a liberated fan blade, a liberated compressor blade or a liberated turbine blade, very high radial loads combined with very high torsional windup provide significant design challenges to the bearings and to the spring finger housing for the ball bearing. The radial load closes the damper gap and the radial bumper gap and creates a harmonic drive effect that loads the spring fingers in torsion. This torsion load on the bearing and its retention housing structure results in an opposing sinusoidal load distribution that twists the spring fingers enough so that the spring fingers develop cracks, which are very undesirable.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a housing structure for retention of the outer race of a ball bearing that acts to retain the axial position of the HP shaft has spring fingers that are flat and short. The retention housing includes a spring finger housing connected to a ball bearing housing that is disposed radially inwardly from the spring finger housing. The forward end of the spring finger housing is connected to the forward end of the ball bearing housing via a connecting web, and the spring finger housing includes a plurality of spring fingers.

The aft end of the ball bearing housing includes a plurality of edge recesses that extend radially into the aft end of the ball bearing housing, and each edge recess has an open end that is facing toward the spring finger housing. Each edge recess includes a blind end that is spaced apart in the radial direction from the open end of the edge recess. Each edge recess is further defined by a forward wall that extends in the radial direction from the open end to the blind end. Each of the plurality of edge recesses is spaced apart from each other edge recess in the circumferential direction around the aft end of the ball bearing housing, and this spacing desirably is uniform between adjacent edge recesses.

The interface shell defines a respective plurality of lug tabs. Each one of the plurality of lug tabs extends away from the interface shell in the radial direction and toward the central axis of the retention housing. Each one of the plurality of lug tabs is received in a respective one of the edge recesses to limit the deflections of the spring fingers and self-arrest the distortion of the spring finger structure.

Between the free ends of the lug tabs of the interface shell that opposes the blind ends of the edge recesses of the aft end of the ball bearing housing, there is defined a radial gap that acts to retain the spring finger housing in a radial direction.

Between the side peripheral surfaces of the lug tabs of the interface shell that oppose the side wall surfaces of the edge recesses of the aft end of the ball bearing housing, there are defined circumferential gaps that act to retain the spring finger housing in the circumferential direction. Each of these circumferential gaps desirably is smaller than each of the radial gaps.

Between the forward peripheral surfaces of the lug tabs of the interface shell that oppose the forward wall surfaces of the edge recesses of the aft end of the ball bearing housing, there are defined axial gaps that act to retain the spring finger housing in the axial direction.

The number, placement and dimensions of the lug tabs and the aforementioned radial gaps and circumferential gaps are controlled according to the anticipated load in consideration of the retention housing structure's size and material composition.

The resulting design of the retention housing integrates the structural components such that they become capable of withstanding the torsional windup and high radial loads that occur with the sudden increase in load that accompanies a blade failure, whether a fan blade, a compressor blade or a turbine blade.

Moreover, due to the unique tapered and short spring finger design, the amount of axial and radial space needed for the retention housing is reduced along with a concomitant reduction in the weight of the retention housing structure while affording a very high torsional load capability to the retention housing structure.

In another exemplary embodiment of the present disclosure, a gas turbine engine includes a compressor section having at least one compressor and a turbine section located downstream of the compressor section and including at least one turbine. The compressor section can include a low pressure compressor and a high pressure compressor downstream of the low pressure compressor. The turbine section includes a high pressure (HP) turbine and a low pressure (LP) turbine downstream of the HP turbine. The gas turbine engine also includes a high pressure shaft mechanically coupling the high pressure compressor to the high pressure turbine via a ball bearing and which includes a retention housing for the outer race of the ball bearing as described summarily above and in greater detail below. Moreover, embodiments of the retention housing as summarily described above and in more detail hereinafter with various alternative embodiments also can be applied to systems with a low pressure shaft that need to address similar challenges with ball bearing components.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF ILLUSTRATIVE EMBODIMENTS

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of any claims and their equivalents. The detailed description uses numerical and letter designations to refer to features in the drawings. Like or similar designations in the drawings and description have been used to refer to like or similar parts of the invention, and identical numerals indicate the same elements throughout the drawings. As used herein, the terms "first", "second", and "third" may be used interchangeably to distinguish one component from another and are not intended to signify location or relative importance of the individual components.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid can be a gas such as air or a liquid such as a lubricant or liquid fuel. With respect to a device through which fluid is flowing, unless otherwise stated or apparent from the context, assuming the device is stationary or moving toward the fluid, then the fluid flows from the forward end of the device toward the aft end of the device.

Figure 1:
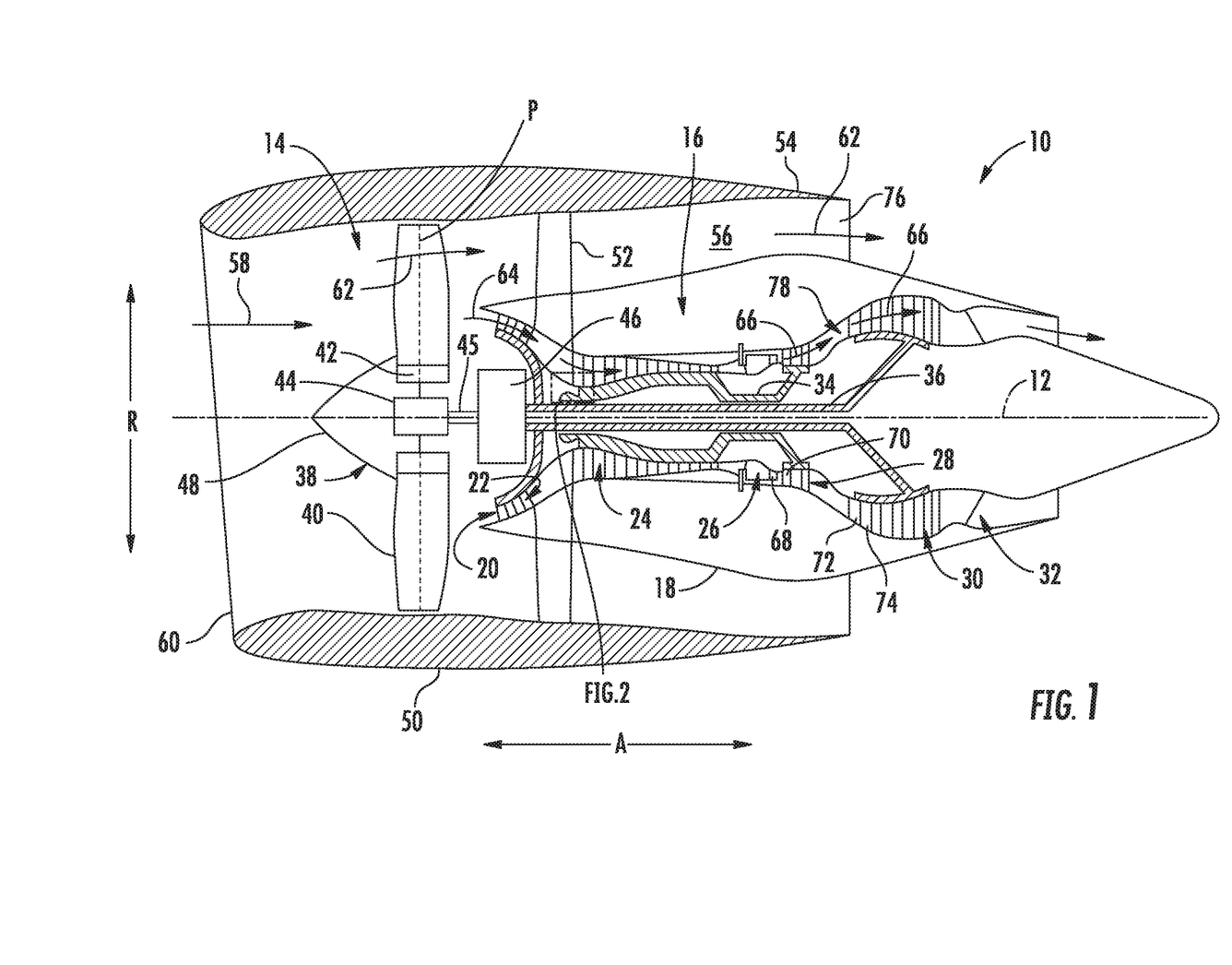
FIG. 1 is a schematic cross-sectional view of an exemplary gas turbine engine according to various embodiments of the present disclosure.
Figure 3:
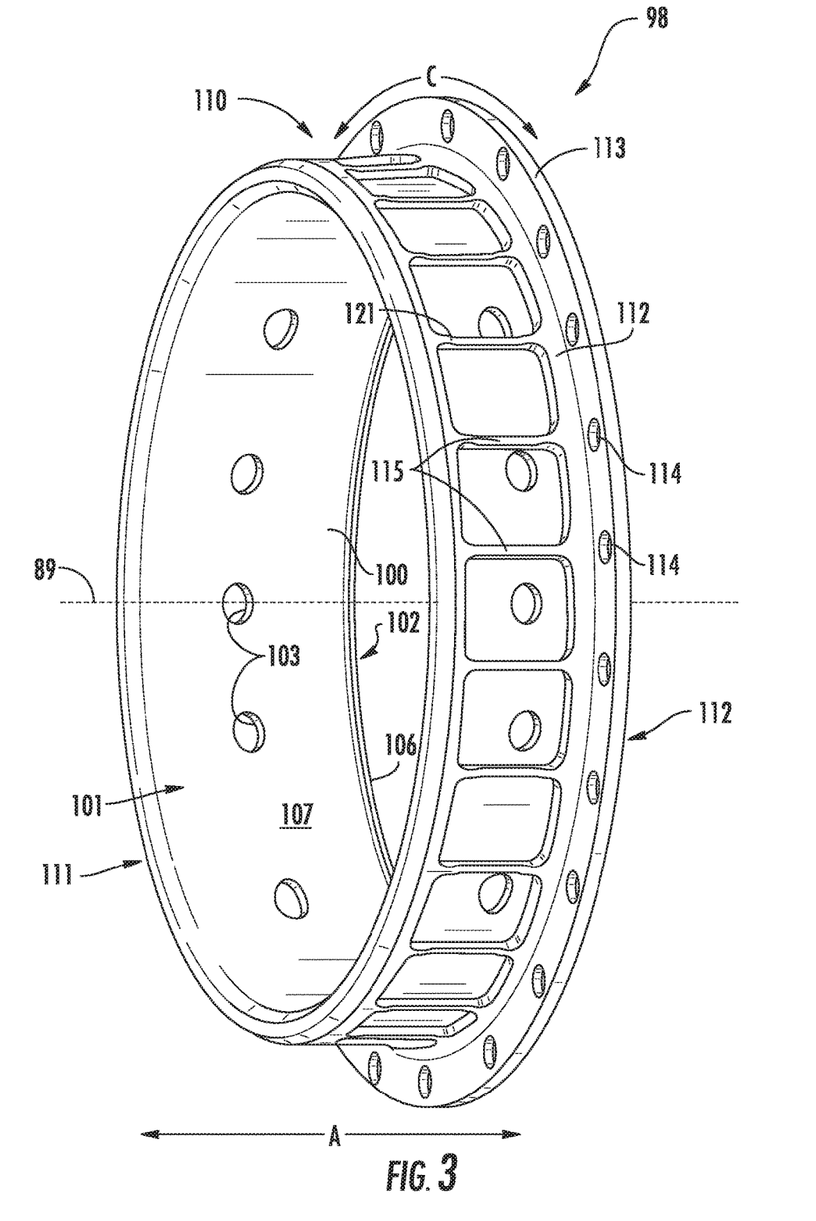
FIG. 3 is a perspective view of an exemplary embodiment of the retention housing component schematically depicted in FIG. 2.

Referring now to the drawings, FIG. 1 is a schematic cross-sectional view of a gas turbine engine that provides a typical environment in which one expects to find exemplary embodiments of the present disclosure. More particularly, for the embodiment of FIG. 1, the gas turbine engine is a high-bypass turbofan jet engine 10, referred to herein as "turbofan engine 10." Such engines typically embody a cylindrical symmetry. As shown in FIG. 1, the turbofan engine 10 defines an axial direction A (extending parallel to a longitudinal centerline 12 provided for reference) and a radial direction R that is normal to the axial direction A. As schematically shown in FIG. 3 for example, the circumferential direction C revolves 360° around the axial direction A. As generally depicted in FIG. 1, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. As schematically shown in FIG. 1, the outer casing 18 encases, in serial flow relationship, a compressor section including a booster or low pressure (LP) compressor 22 followed downstream by a high pressure (HP) compressor 24; a combustion section 26; a turbine section including a high pressure (HP) turbine 28 followed downstream by a low pressure (LP) turbine 30; and a jet exhaust nozzle section 32. A high pressure (HP) shaft or spool 34 drivingly connects the HP turbine 28 to the HP compressor 24 to rotate them in unison concentrically with respect to the longitudinal centerline 12. A low pressure (LP) shaft or spool 36 drivingly connects the LP turbine 30 to the LP compressor 22 to rotate them in unison concentrically with respect to the longitudinal centerline 12. The compressor section, combustion section 26, turbine section, and nozzle section 32 together define a core air flowpath.

For the embodiment depicted in FIG. 1, the fan section 14 includes a variable pitch fan 38 having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 via a fan shaft 45 that is powered by the LP shaft 36 across a power gear box 46. The power gear box 46 includes a plurality of gears for adjusting the rotational speed of the fan shaft 45 and thus the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Alternatively, the nacelle 50 also may be supported by struts of a structural fan frame. Moreover, a downstream section 54 of the nacelle 50 may extend over an outer portion of the core turbine engine 16 so as to define a bypass airflow groove 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrow 62 is directed or routed into the bypass airflow groove 56, and a second portion of the air 58 as indicated by arrow 64 is directed or routed into the upstream section of the core air flowpath, or more specifically into the inlet 20 of the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where the highly pressurized air is mixed with fuel and burned to provide combustion gases 66.

The combustion gases 66 are routed into and expand through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and expand through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow groove 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that in other exemplary embodiments, any other suitable HP compressor 24 and HP turbine 28 configurations may be utilized. It also should be appreciated, that in still other exemplary embodiments, aspects of the present disclosure may be incorporated into any other suitable gas turbine engine. For example, in other exemplary embodiments, aspects of the present disclosure may be incorporated into, e.g., a turboshaft engine, turboprop engine, turbocore engine, turbojet engine, etc., as well as turbine engines used for other vehicles or in stationary applications.

Figure 2:
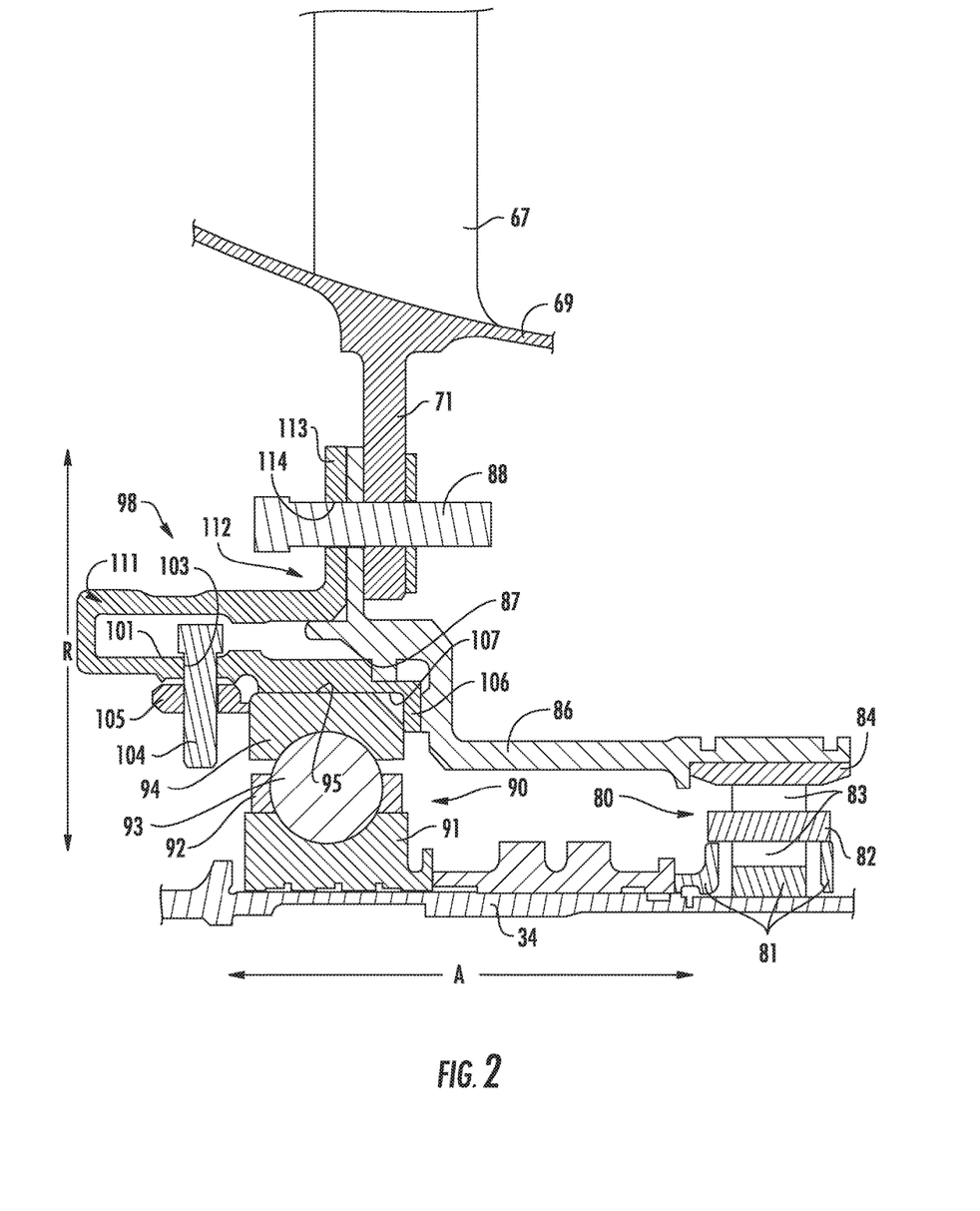
FIG. 2 is an exploded, schematic cross-sectional view of components within the dashed outline of the box designated FIG. 2 in FIG. 1.

FIG. 2 presents an exploded, schematic cross-sectional view of components within the dashed outline of the box designated FIG. 2 in FIG. 1. One end of a stator vane 67 of the HP compressor 24 is mounted to a stationary structural frame 69, while the opposite end of the stator vane 67 is truncated in the view shown in FIG. 2 but would be held fixed with respect to the outer casing 18. A flange 71 is connected to and depends radially inwardly from the stationary structural frame 69. The inner ring 81 of a roller bearing 80 is non-rotatably coupled to the HP spool 34. The roller bearing 80 includes a cage 82, a plurality of rollers 83 (only one roller 83 being depicted in the view shown in FIG. 2) and an outer ring 84. As schematically shown in FIG. 2, interface shell 86 non-rotatably couples the outer ring 84 of the roller bearing 80 to the flange 71 of the stationary structural frame 69 via a mechanical fastener such as a bolt 88. It should be appreciated that there will be a plurality of such bolts 88 spaced apart from one another around the entire circumference of the outer ring 84.

The inner ring 91 of a conventional ball bearing 90 is non-rotatably coupled to the HP spool 34. The ball bearing 90 also includes a cage 92, a plurality of rotatable balls 93 (only one ball 93 being shown in the view of FIG. 2) and an outer ring 94, which is disposed radially outwardly farther away from the axis of rotation 12 than the disposition of the inner ring 91.

In accordance with an embodiment of the present invention, a retention housing 98 is generally designated by the numeral 98 in FIGS. 2, 3, 4 and 5. The retention housing 98 is configured and disposed for retaining the ball bearing 90 and absorbing the loads that result from a failure of one or more of a fan blade, a compressor blade or a turbine blade when any such blade suffers any compromise of its structural integrity, e.g., becomes at least partially detached or broken. As shown in FIG. 3 for example, the retention housing 98 desirably includes a ball bearing housing 100 and a spring finger housing 110. As schematically shown in FIG. 3 for example, each housing 100, 110 is a cylindrically symmetrical component that is disposed concentrically with respect to a central rotational axis 89 of the retention housing 98.

As schematically shown in FIG. 2 for example, the retention housing 98 non-rotatably couples to the flange 71 of the stationary structural frame 69, the outer ring 94 of the ball bearing 90 for a high pressure spool 34 of a gas turbine engine 10. The spring finger housing 110 can be fixed with respect to the outer casing 18 as by being mechanically bolted or welded to the flange 71. In one exemplary embodiment, the spring finger housing 110 is rendered stationary by being coupled to the outer casing 18 in a manner that can be performed in any of a number of conventional manners, any one of which being suitable for purposes of illustrating exemplary embodiments of the present disclosure. As shown in FIG. 2 for example, this can be accomplished via an annular mounting flange 113 that elongates generally in a radial direction from the aft end 112 of the spring finger housing 110. The spring finger housing 110 and the annular mounting flange 113 desirably are formed as a monolithic structure.

As shown in FIG. 3, the annular mounting flange 113 is drilled with a plurality of axially extending mounting holes 114 therethrough. These mounting holes 114 are spaced circumferentially apart from one another around the entire circumference of the mounting flange 113. As shown in FIG. 2 for example, each of the mounting holes 114 through the annular mounting flange 113 of the retention housing 98 desirably is configured to receive a respective mounting bolt 88 (one of which being depicted in cross-section in the view of FIG. 2) by which the mounting flange 113 may be attached to the flange 71 of the stationary structural frame 69. As shown in FIG. 2 for example, the annular mounting flange 113 non-rotatably couples the spring finger housing 110 to the flange 71 of the stationary structural frame 69 via a mechanical fastener such as a bolt 88, which enables the retention housing 98 to be removed from the engine 10 for replacement, maintenance and/or repair.

Figure 5:
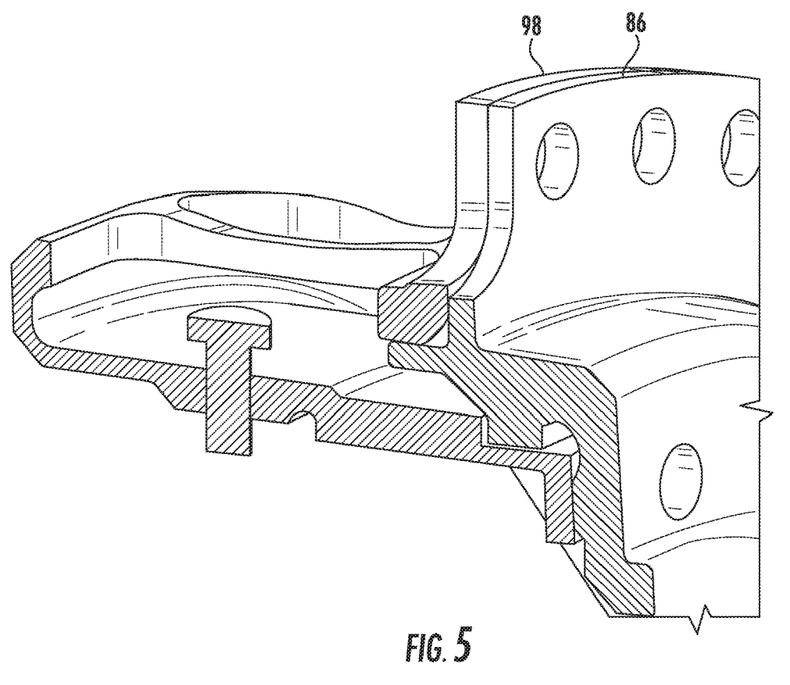
FIG. 5 is a view partly in perspective and partly in cross-section of the region identified by the arrows designated 5-5 in FIG. 4 to illustrate both an axial gap and a radial gap of the exemplary embodiment of the retention housing component depicted in FIGS. 2-4 and 6.

As schematically shown in FIGS. 3 and 5 for example, the ball bearing housing 100 defines its own forward end 101, which is disposed axially apart from its own aft end 102. Similarly, as schematically shown in FIGS. 3 and 5 for example, the spring finger housing 110 defines its own forward end 111, which is disposed axially apart from its own aft end 112.

As shown in FIGS. 3 and 5 for example, between the forward end 101 and midpoint of the ball bearing housing 100 there is defined a plurality of openings 103, each opening 103 extending radially through the ball bearing housing 100. Each such opening 103 is configured to receive therein an attachment bolt 104 such as depicted in cross-section in FIG. 2 and which is locked by a retention nut 105. As shown in FIG. 3 for example, the ball bearing housing 100 includes a retention flange 106, which extends radially inwardly toward the central axis 89 from the aft end 102 of the ball bearing housing 100. As shown in FIG. 2 for example, the outer ring 94 of the ball bearing 90 is restrained against axial movement by being held between the retention flange 106 of the ball bearing housing 100 and the retention nut 105. Accordingly, under normal operating conditions of the engine 10, the outer ring 94 of the ball bearing 90 becomes restrained against axial movement with respect to the HP spool 34.

As schematically shown in FIGS. 2 and 3, the ball bearing housing 100 defines a cylindrical inner surface 107 that is disposed equidistantly from the central axis of rotation 89 that extends in an axial direction (A). As shown in FIG. 2 for example, this inner surface 107 of the ball bearing housing 100 of the retention housing 98 desirably contacts the cylindrically shaped outer surface 95 of the outer ring 94 of the ball bearing 90. As schematically shown in FIGS. 1 and 2 for example, the radial direction (R) (and thus the diametrical direction) is defined in a direction that is normal to the axial direction (A) and normal to the central axis of rotation 89.

As schematically shown in FIGS. 2, 3 and 5 for example, the spring finger housing 110 is disposed radially apart from and radially outwardly from the ball bearing housing 100 and disposed concentrically around the ball bearing housing 100.

As schematically shown in FIGS. 2, 3 and 5 for example, each embodiment of the retention housing 98 desirably includes a connecting web disposed at the forward end of the retention housing 98. As shown in FIG. 5 for example, the connecting web spans between the forward end 111 of the spring finger housing 110 and the forward end 101 of the ball bearing housing 100. The connecting web provides for the retention housing 98 a fulcrum between the forward end 111 of the spring finger housing 110 and the forward end 101 of the ball bearing housing 100. Each connecting web extends generally in the radial direction (R) between the ball bearing housing 100 and the spring finger housing 110. Desirably, the spring finger housing 110, the connecting web and the ball bearing housing 100 are formed as a monolithic structure, i.e., as a single piece without joints or seams.

As schematically shown in the cross-sectional portion of FIG. 5 in a virtual plane defined by the radial and axial directions, the connecting web takes on a shape that resembles the letter C. As schematically shown in FIGS. 2 and 5 for example, the connecting web includes a radial section that extends in the radial direction (R). As shown in FIG. 5 for example, a first elbow section connects the radial section to the forward end 111 of the spring finger housing 110 by a gradual bend over the right angle that exists between the radial (R) and axial (A) directions. A second elbow section similarly connects the radial section to the forward end 101 of the ball bearing housing 100. The connecting web functions as a flexure that permits small radial displacements between the aft end 102 of the ball bearing housing 100 and the interface shell 86 and accordingly between the aft end 102 of the ball bearing housing 100 and the aft end 112 of the spring finger housing 110.

Figure 4:
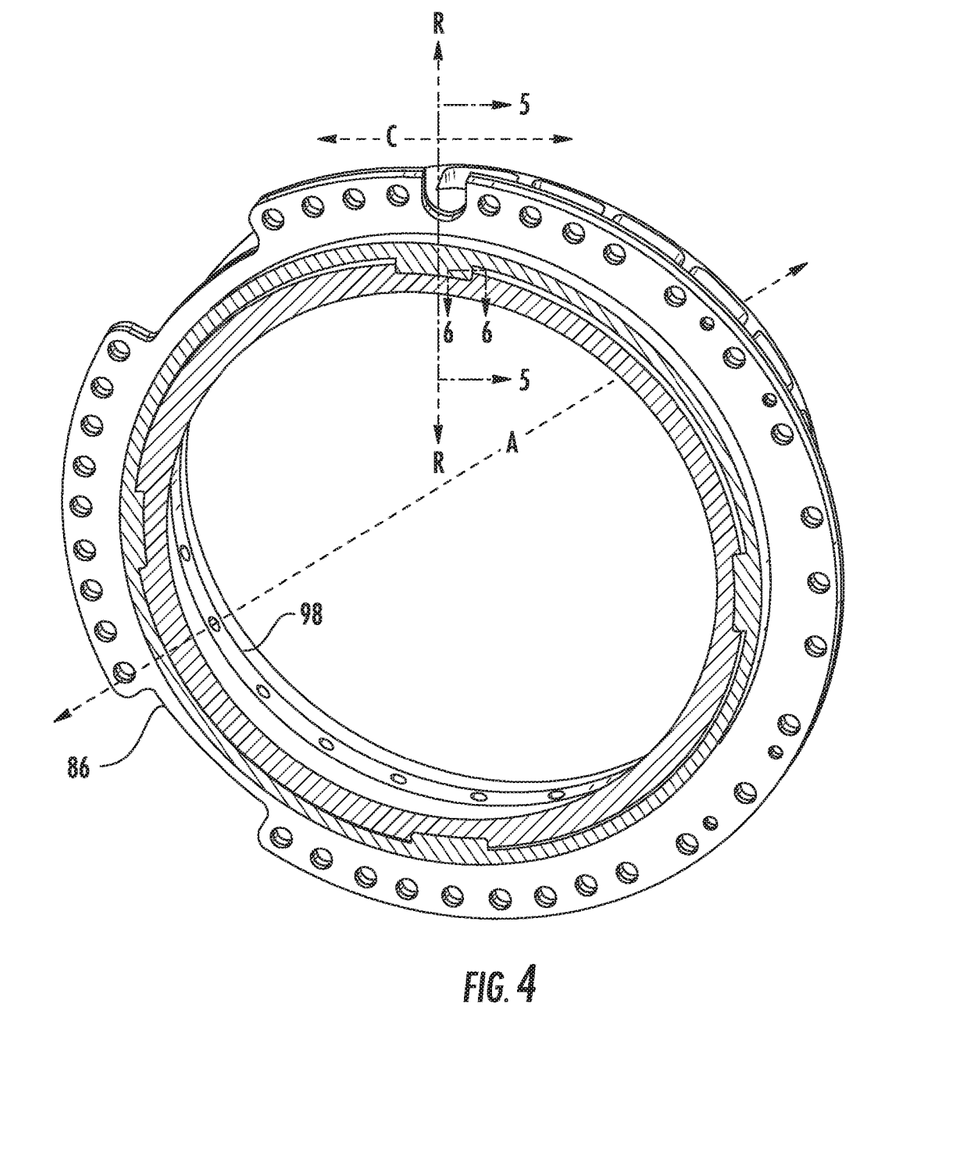
FIG. 4 is a perspective view taken from the aft end of the embodiment of the retention housing shown in FIG. 3 and with a portion of the aft end of the interface shell cut away to reveal components of interest for purposes of facilitating explanation of aspects of the invention.

As schematically shown in FIGS. 2, 4 and 5 for example, the aft end 102 of the ball bearing housing 100 defines a plurality of edge recesses. As shown schematically in FIG. 5 for example, each edge recess extends in the radial direction (R) from an open end to a blind end that is spaced apart in the radial direction (R) from the open end of the edge recess. As schematically shown in FIG. 5 for example, the open end of each edge recess is facing toward the spring finger housing 110. As to movements in the radial direction (R), the entrance to each edge recess is disposed closer to the spring finger housing 110 than is the disposition of the blind end of each edge recess, and thus the blind end faces away from the spring finger housing 110. Thus, when moving in the radial direction (R) each edge recess can be entered from open end of each edge recess or that is defined in the aft end 102 of the ball bearing housing 100.

The blind end of each edge recess is "blind" because it prevents the edge recess from extending in a radial direction (R) completely through the aft end 102 of the ball bearing housing 100. Thus, the blind end of each edge recess closes off the end of each edge recess that is opposite to the open end of each edge recess.

As shown schematically in FIG. 5 for example, the forward end of each edge recess is defined by a forward wall that desirably has a curved cylindrical shape. As shown schematically in FIGS. 4 and 6 for example, each of the circumferentially opposing ends of each edge recess is defined by a respective side wall that limits the dimension of the edge recess in the circumferential direction (C). The length dimension of the forward wall and side walls measured in the radial direction defines the depth of each edge recess. As shown schematically in FIG. 5 for example, the depth of each edge recess in the radial direction is less than the thickness of the aft end 102 of the of the ball bearing housing 100. Each edge recess has a depth that extends in the axial direction (A) from the forward wall and through the aft end 102 of the ball bearing housing 100. Thus, when moving in the axial direction (A) each edge recess can be entered from the aft end 102 of the ball bearing housing 100.

As schematically shown in FIG. 4 for example, the interface shell 86 includes a plurality of lug tabs. The lug tabs are provided to cooperate with the edge recesses so as to restrain movement between the aft end 102 of the ball bearing housing 100 and the interface shell 86, which as described above is non-rotatably coupled to the outer casing 18 of the engine 10 shown in FIG. 1 for example. Each of the plurality of lug tabs extending radially from the interface shell 86 is disposed so as to be aligned with a respective one of the plurality of edge recesses to form a plurality of aligned edge recesses and lug tabs. Though only four lug tabs are depicted in the embodiment shown in FIG. 4 for example, other embodiments can include a different number and relative sizing of the lug tabs as warranted by the load requirements that are anticipated in a particular application.

As schematically shown in FIG. 4 for example, each of the plurality of lug tabs extends radially for a discrete distance in the radial direction (R) from the interface shell 86 toward the central axis 89 of the retention housing 98. As schematically shown in FIG. 5 for example, each of the plurality of lug tabs also extends axially for a discrete length in the axial direction (A). As schematically shown in FIGS. 4 and 6 for example, each of the plurality of lug tabs also extends circumferentially for a discrete arc length in the circumferential direction (C).

Figure 6:
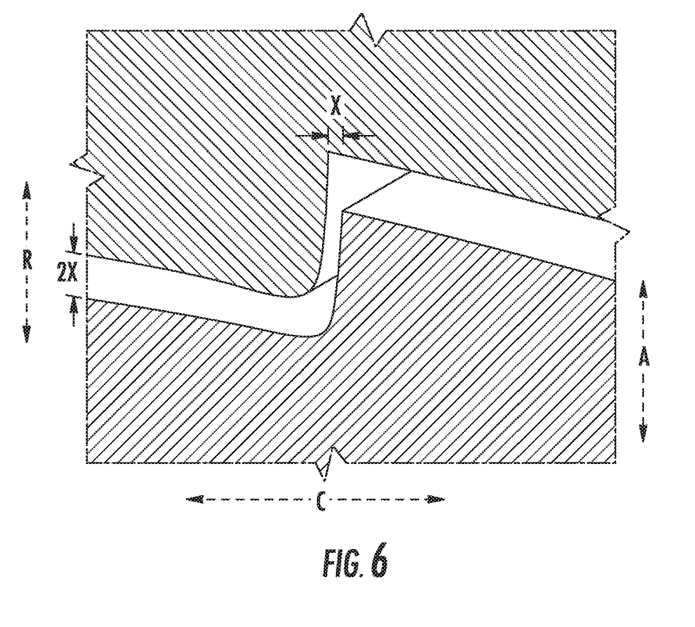
FIG. 6 is an enlarged, schematic cross-sectional view of the section identified by the arrows designated 6-6 in FIG. 4 to illustrate both a circumferential gap and a radial gap of the exemplary embodiment of the retention housing component depicted in FIG. 5.

As schematically shown in FIGS. 5 and 6 for example, a respective one of the plurality of lug tabs is disposed in a respective one of the plurality of edge recesses, which is dimensioned to be larger than the dimensions of the lug tab. Accordingly, as schematically shown in FIG. 5 for example, gaps are afforded between the cylindrical surfaces that define the forward walls of the edge recesses and their concentrically shaped cylindrical surfaces that define the peripheral exterior forward surfaces of the lug tabs to allow relative axial movement between the lug tab and the cylindrical forward wall surfaces that define the edge recess. These gaps will be disposed completely surround the peripheral surfaces of the lug tab and thus exist in both the axial direction (A) and circumferential direction (C). Accordingly, the dimensions of each edge recess measured in both the axial direction (A) and the circumferential direction (C) are larger than the dimensions measured in the same directions for the lug tab by on the order of 20 thousandths to 50 thousandths of an inch. In this way, as shown schematically in FIG. 5 for example, the retention housing 98 permits a certain amount of displacement in the axial direction (A) to occur between the aft end 102 of the ball bearing housing 100 and the lug tab that is projecting from the interface shell 86 before limiting the further axial deflection of the retention housing 98 when the peripheral surfaces of the lug tab come into contact with the cylindrical forward walls that define the edge recess. Similarly, as shown schematically in FIGS. 4 and 6 for example, the retention housing 98 permits a certain amount of displacement in the circumferential direction (C) to occur between the aft end 102 of the ball bearing housing 100 and the lug tab that is projecting from the interface shell 86 before limiting the further circumferential deflection of the retention housing 98 when the peripheral surfaces of the lug tab come into contact with the side walls that define the edge recess in the circumferential direction (C).

Moreover, as shown schematically in FIGS. 5 and 6 for example, the blind end of the edge recess is disposed deep enough in the radial direction (R) to allow for on the order of 20 thousandths to 50 thousandths of an inch gap between the free end of the lug tab and the blind end of the edge recess. This radial gap allows the retention housing 98 to permit a certain amount of displacement in the radial direction (R) to occur between the aft end 102 of the ball bearing housing 100 and the free end of the lug tab before limiting the further radial deflection of the retention housing 98 when the free end of the lug tab eliminates the radial gap by coming into contact with the blind end of the edge recess. As schematically shown in FIG. 6 for example, the circumferential gap of "X" dimension is desirably smaller than and only a fraction of the radial gap of "2X" dimension.

As schematically shown in FIGS. 3 and 5 for example, the spring finger housing 110 defines a plurality of axially extending fingers 115. Each finger 115 defines a forward end 121 and an aft end disposed axially spaced apart from and opposite to the forward end 121 of each respective finger 115. As shown in FIG. 3 for example, each of the fingers 115 is spaced apart circumferentially from each of its adjacent nearest circumferentially neighboring fingers 115 disposed around the spring finger housing 110, the circumferential direction being schematically indicated by the arrows designated by the letter C. Desirably, the plurality of forward ends 121 of the fingers 115 and the aft ends of the fingers 115 form a monolithic structure with the spring finger housing 110.

As schematically shown in FIGS. 3 and 5 for example, each of the fingers 115 includes an intermediate portion that extends axially between each respective front end 121 and respective aft end of each respective finger 115. Each of these intermediate portions is narrower than each respective front end 121 and respective aft end of each respective finger 115. Each finger 115 undergoes a tapering from each opposite end 121, of each respective finger 115 to a certain degree until the narrowed dimension of that finger 115 is attained. Each opposite circumferential side and top and bottom surface of each finger 115 can be machined to attain the desired tapering. The specific relative dimensions of the intermediate portions with respect to the front ends 121 and aft ends will depend upon the dimensions and composition of the retention housing 98 as well as the anticipated level of stress for which the retention housing 98 is being engineered. In a typical case, because of this tapering of the fingers 115, the axial lengths of the fingers 115 can be shortened relative to the lengths of conventional fingers. Additionally, the tapering of the fingers 115 results in a reduction in the overall weight of the retention housing 98 when compared to a conventional retention housing.

During normal engine operation, the ball bearing assembly 90 acts to retain the axial position of the HP spool 34, and the associated roller bearing assembly 80 acts to provide radial damping of the fan/rotor system. In the embodiment shown in FIGS. 2 and 6 for example, a radial bumper gap is defined between the aft end 102 of the ball bearing housing 100 and the overlying inner surface 87 of the interface shell 86 that is connected to the outer ring 84 of the roller bearing 80 as schematically shown in FIG. 2 for example. The size of this radial bumper gap is controlled to absorb the anticipated relatively small radial deviations of the HP spool 34 and typically would have dimensions within a range on the order of 5 thousandths of an inch to 20 thousandths of an inch.

However, during a failure mode that results from a liberated fan blade, or a liberated compressor blade or a liberated turbine blade, very high radial loads close the bumper gap in the embodiment depicted in FIGS. 2 and 6. The very high radial loads create a harmonic drive effect that loads the spring fingers 115 in torsion, i.e., in the circumferential direction (C) as schematically indicated in FIG. 3. This torsion load on the ball bearing 90 and its retention housing 98 results in an opposing sinusoidal load distribution that tends to twist the spring fingers 115. However, this twisting becomes damped by the restraining force exerted by the lug tabs in the circumferential direction to prevent larger circumferential movement between the ball bearing housing 100 and the spring finger housing 110.

The retention housing 98 described herein with its ball bearing housing 100 engaged to the interference shell 86 in an arrangement of edge recesses matched up with respective lug tabs has several advantages over the prior art. By employing edge recesses of different sizes as well as different numbers of edge recesses and different spacings between adjacent edge recesses around the circumference of the aft end 102 of the ball bearing housing 100 of the retention housing 98 to receive therein respective lug tabs of the interface shell 86 for the ball bearing 90, damping can be controlled according to the anticipated load in consideration of the size and material composition of the structure of the retention housing 98. The resulting design of the retention housing 98 integrates the structural components such that they become capable of withstanding the torsional windup and high radial loads that occur with the sudden increase in load that accompanies a blade failure, whether a fan blade, a compressor blade or a turbine blade. Moreover, due to the unique tapered and relatively short design of the spring fingers 115, the amount of axial and radial space needed for the retention housing 98 is reduced along with a concomitant reduction in the weight of the retention housing 98 while affording a very high torsional load capability to the retention housing 98.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A retention housing for the outer race of a ball bearing for a high pressure spool of a gas turbine engine, the axial spool defining an axis of rotation, the engine having an interface shell configured to engage the retention housing to restrain axial movement of the retention housing, the retention housing comprising:
    a ball bearing housing defining a cylindrical inner surface that is disposed equidistantly from an axis of rotation that extends in an axial direction, a radial direction being defined in a direction that is normal to the axial direction, the ball bearing housing defining a forward end disposed axially spaced apart from an aft end;
    a spring finger housing disposed radially apart from and radially outwardly from the ball bearing housing and disposed concentrically around the ball bearing housing, the spring finger housing defining a forward end disposed axially spaced apart from an aft end, the forward end of the spring finger housing being connected to the forward end of the ball bearing housing;
    the spring finger housing defining a plurality of axially extending fingers, each finger defining a forward end and an aft end disposed axially spaced apart from and opposite to the forward end of each respective finger, each finger being spaced circumferentially apart from each nearest adjacent finger, the plurality of forward ends of the fingers forming a monolithic structure with the spring finger housing, and the plurality of aft ends of the fingers forming a monolithic structure with the spring finger housing;
    the aft end of the ball bearing housing defining a plurality of edge recesses, each edge recess being defined by a depth extending in the radial direction away from the spring finger housing and extending in the aft direction away from the forward end of the ball bearing housing; and
    wherein the gas turbine engine, further comprises a plurality of lug tabs, a respective one of the plurality of lug tabs being disposed in a respective one of the plurality of edge recesses, each lug tab has one end that is disposed at least partially within the respective edge recess and an opposite end projecting radially from the interface shell.

2. The retention housing of claim 1, wherein the depth of each edge recess in the radial direction is less than the thickness of the aft end of the of the ball bearing housing.

3. The retention housing of claim 1, wherein each edge recess is configured to engage the interface shell.

4. The retention housing of claim 1, wherein each edge recess is configured to engage the interface shell in a manner so that each edge recess includes a circumferential gap between the aft end of the of the ball bearing housing and the interface shell.

5. The retention housing of claim 1, wherein a circumferential gap is on the order of 20 thousandths of an inch to 50 thousandths of an inch.

6. The retention housing of claim 1, wherein each finger includes an intermediate portion disposed between the forward end and the aft end of each finger, and the intermediate portion of each finger is tapered with respect to the forward end and the aft end of each finger.

7. The retention housing of claim 6, wherein the intermediate portion of each finger is thicker than the forward end of each finger.

8. The retention housing of claim 1, wherein the spring finger housing and the ball bearing housing are formed as a monolithic structure.

9. The retention housing of claim 1, further comprising an annular mounting flange extending radially outwardly from the aft end of the spring finger housing.

10. The retention housing of claim 1, wherein the spring finger housing and the annular mounting flange are formed as a monolithic structure.

11. A gas turbine engine, comprising:
a fan including a plurality of blades extending radially from a hub and rotatable about a first axis of rotation defined centrally through the hub;
a compressor disposed downstream from the fan;
a turbine disposed downstream of the compressor;
a rotatable input shaft mechanically coupling the compressor to rotate in unison with the turbine;
an engine envelope surrounding the fan, the compressor, and the turbine; and
an outer casing disposed within the engine envelope and surrounding the compressor and the turbine;
a ball bearing having an inner race rotatable with respect to an outer race, wherein the inner race is non-rotatably coupled to the input shaft;
an interface shell that is non-rotatably coupled to the outer casing; and
a retention housing that non-rotatably couples the outer casing to the outer race of the ball bearing; and
wherein the retention housing further including:
a ball bearing housing defining a cylindrical inner surface that is disposed equidistantly from an axis of rotation that extends in an axial direction, a radial direction being defined in a direction that is normal to the axial direction, the ball bearing housing defining a forward end disposed axially spaced apart from an aft end;
a spring finger housing disposed radially apart from and radially outwardly from the ball bearing housing and disposed concentrically around the ball bearing housing, the spring finger housing defining a forward end disposed axially spaced apart from an aft end, the forward end of the spring finger housing being connected to the forward end of the ball bearing housing,
the spring finger housing defining a plurality of axially extending fingers, each finger defining a forward end and an aft end disposed axially spaced apart from and opposite to the forward end of each respective finger, each finger being spaced circumferentially apart from each nearest adjacent finger, the plurality of forward ends of the fingers forming a monolithic structure with the spring finger housing, and the plurality of aft ends of the fingers forming a monolithic structure with the spring finger housing, and
the aft end of the ball bearing housing defining a plurality of edge recesses, each edge recess extending in the radial direction and defining an open end; and
wherein the gas turbine engine, further comprises a plurality of lug tabs, a respective one of the plurality of lug tabs being disposed in a respective one of the plurality of edge recesses, each lug tab has one end that is disposed at least partially within the respective edge recess and an opposite end projecting radially from the interface shell.

12. The gas turbine engine of claim 11, wherein each edge recess defines a blind end spaced apart in the radial direction from the open end.

13. The gas turbine engine of claim 11, wherein each edge recess defines a blind end spaced apart in the radial direction from the open end of each respective edge recess and disposed farther away from the spring finger housing than the disposition of the open end of each edge recess.

14. The gas turbine engine of claim 11, wherein the end of each respective lug tab that projects from the interface shell defines a free end that is spaced apart in the radial direction from the blind end of the respective edge recess and defines a radial gap between the respective free end and the respective blind end.

15. The gas turbine engine of claim 11, wherein each of the plurality of lug tabs extends radially from the interface shell, each respective one of the plurality of lug tabs being aligned with a respective one of the plurality of edge recesses to form a plurality of aligned lug tabs and edge recesses and wherein each of the plurality of lug tabs defines an exterior peripheral surface that is disposed in opposition to a radially extending wall that partially defines a respective edge recess.

16. The gas turbine engine of claim 15, wherein a circumferential gap is defined between the exterior peripheral surface of a respective one of the plurality of lug tabs and the radially extending wall that partially defines the respective edge recess.

17. The gas turbine engine of claim 15, wherein an axial gap is defined between the exterior peripheral surface of a respective one of the plurality of lug tabs and the radially extending wall that partially defines the respective edge recess.

* * * * *